Jan. 13, 1931.                W. E. BANDEMER                1,789,166
                        LIQUID DEPTH INDICATING DEVICE
                            Filed Nov. 14, 1927

Inventor
William E. Bandemer
Attorneys

Patented Jan. 13, 1931

1,789,166

UNITED STATES PATENT OFFICE

WILLIAM E. BANDEMER, OF ANN ARBOR, MICHIGAN, ASSIGNOR TO KING-SEELEY CORPORATION, OF ANN ARBOR, MICHIGAN, A CORPORATION OF MICHIGAN

LIQUID-DEPTH-INDICATING DEVICE

Application filed November 14, 1927. Serial No. 233,262.

The invention relates to liquid depth indicating devices and refers more particularly to devices for indicating the depth or quantity of liquid in stationary tanks. One of the objects of the invention is to so construct the device that the pressure equalizing means between the tank above the liquid therein and the pressure gage will be maintained free of liquid, even when the tank is completely filled. With this and other objects in view, the invention resides in the novel features of construction and combinations and arrangements of parts as more fully hereinafter set forth.

In the drawings:—

Figure 1:
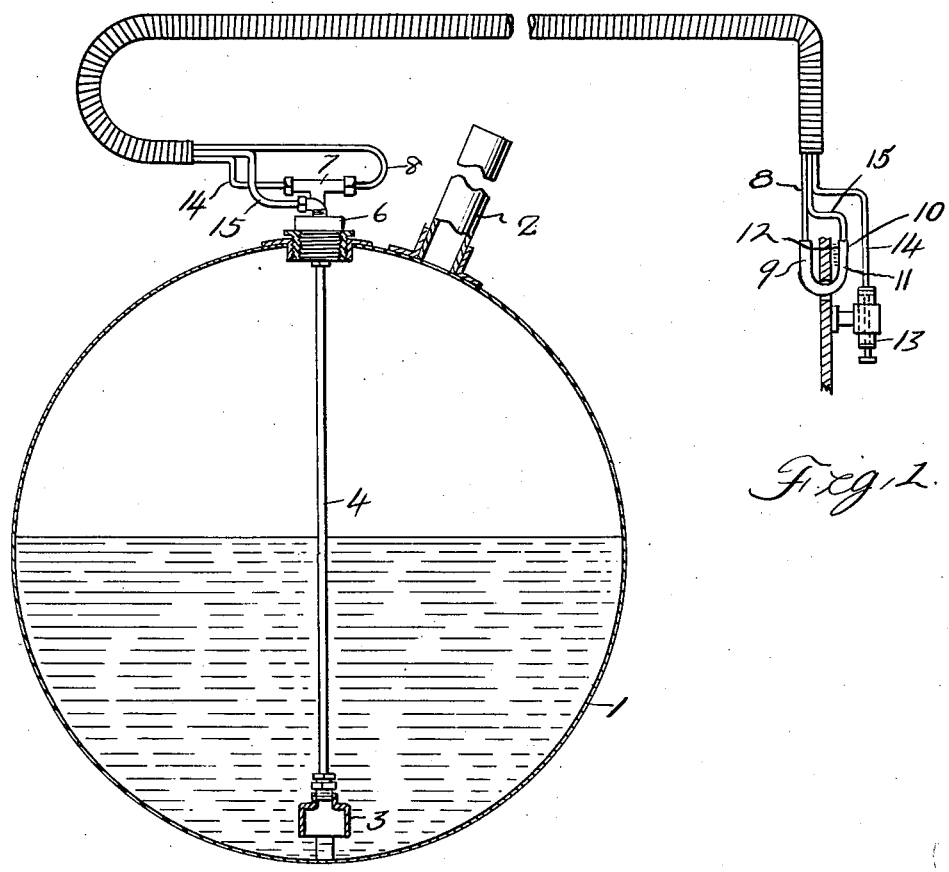
Figure 1 is a sectional elevation of a liquid depth indicating device embodying my invention.
Figure 2:
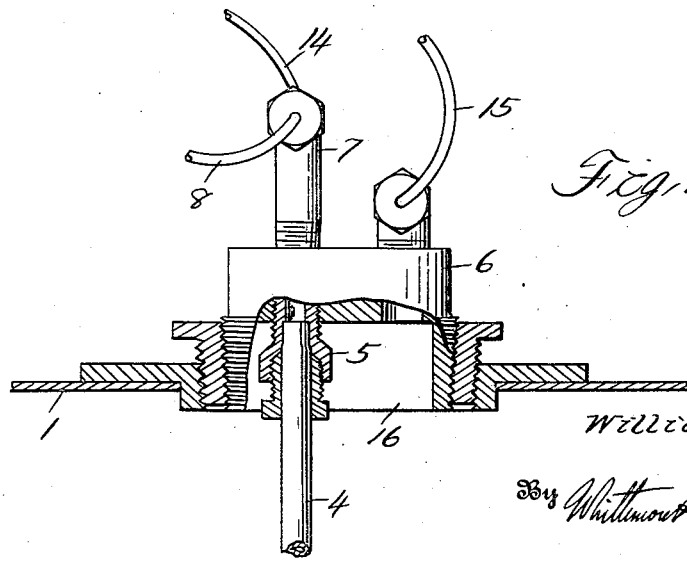
Figure 2 is an enlarged sectional elevation of a portion thereof.

The liquid depth indicating device embodying my invention is particularly applicable as an industrial installation for indicating the depth or quantity of liquid in a stationary tank. As shown in the present instance, 1 is an oil storage tank forming part of an oil burner heating system. This tank has the filler pipe 2 which extends upwardly thereabove. 3 is the air chamber within the tank and near its bottom, this air chamber being in the nature of a bell having its lower end open for placing the bell in communication with the liquid at the level to be measured. 4 is a pressure tube extending upwardly from the air chamber 3 and secured at its upper end to the connector 5, which is mounted upon the member 6, the latter being in the nature of a plug. 7 is a T-fitting mounted upon the member 6 and extending thereabove, the stem of this fitting communicating with the pressure tube 4. 8 is a tube connected at one end to one branch of the T-fitting 7 and at the other end to the enlarged leg 9 of the U-tube pressure gage 10, which latter is usually at a remote point from the storage tank. This pressure gage has the reduced leg 11 which is of smaller cross sectional area than the leg 9 and the graduated scale 12 adjacent to the reduced leg, the graduations being such that they may indicate either or both the depth or quantity of the oil in the storage tank. For introducing air into the air chamber 3 to free the same of oil down to its point of communication with the oil, I have provided the pump 13, which is preferably mounted upon the support for the pressure gage and the tube 14 extending from the pump to the other branch of the T-fitting.

For equalizing the pressures within the storage tank above the oil contained therein and the upper end of the reduced leg 11 of the pressure gage, I have provided the tubing 15, one end of which is connected to the upper end of the reduced leg 11 of the pressure gage and the other end of which is connected to the upper end of the member 6. This member 6 is formed with the chamber 16 below its upper end and opening into the storage tank. The height and diameter of the chamber is such that when the storage tank 1 is completely filled with oil and the filler pipe 2 contains oil and the level of the oil in the filler pipe is above the upper end of the chamber, no oil can reach the tubing 15 owing to the fact that the air trapped in the tubing and chamber cannot be forced back entirely into the tubing. As a result, the pressure within the pressure gage and above the indicating liquid therein remains at all times equal to the pressure within the storage tank and above the oil contained therein.

What I claim as my invention is:

1. The combination with a tank containing liquid and having a filler pipe extending upwardly thereabove, of an air chamber within said tank and communicating with the liquid at the depth to be measured, a pressure gage, means for placing said air chamber and one side of said pressure gage in communication, means for introducing air into said air chamber to free the same of liquid down to the point of communication of said air chamber with the liquid, and means for placing the other side of said pressure gage and said tank above the liquid in communication to equalize the pressure therebetween, said last mentioned means having an enlarged portion at its point of communication with said tank so that the liquid does not pass beyond the enlarged portion into the remaining portion when said tank and filler pipe are full of liquid.

2. The combination with a tank containing liquid and having a filler pipe extending upwardly thereabove, of an air chamber within said tank and communicating with the liquid at the level to be measured, a U-tube pressure gage, means for placing said air chamber and one leg of said pressure gage in communication, means for introducing air into said air chamber to free the same of liquid down to the point of communication of said air chamber with the liquid, and means for equalizing the pressure within said tank above the liquid and the other leg of said pressure gage, said equalizing means including tubing connected at one end to the last mentioned leg and a chambered member connected at its upper end to the other end of said last mentioned tubing and formed with a chamber located at a level below that of the upper end of said filler pipe, said chambered member having an opening at its lower end in communication with the upper part of said tank and the height of said chambered member being such that the liquid does not enter said last mentioned tubing when the level of liquid in said filler pipe is above said chamber.

3. The combination with a stationary tank containing liquid and having a filler pipe extending thereabove, of an air chamber within said tank and communicating with the liquid at the level to be measured, a U-tube pressure gage, means including tubing for placing said air chamber and one leg of said pressure gage in communication, means for introducing air into said air chamber to free the same of liquid down to the point of communication of said air chamber with the liquid, and means for equalizing the pressure within said tank above the liquid and the other leg of said pressure gage, said equalizing means including a plug having a chamber below its top and the upper end of said filler pipe in communication with the upper part of said tank, and tubing between and communicating with the upper end of the chamber in said plug and the last mentioned leg of said pressure gage, said last mentioned tubing and plug forming an air trap and the height of said plug being such that the liquid does not pass from said tank through the chamber in said plug into said last mentioned tubing when the level of liquid in said filler pipe is above said chamber.

4. The combination with a tank containing liquid and having a filler pipe extending upwardly thereabove, of an air chamber within said tank and communicating with the liquid at the depth to be measured, a pressure gauge, means for placing said air chamber and one side of said pressure gauge in communication, and means for placing the other side of said pressure gauge and said tank above the liquid in communication to equalize the pressure therebetween, said last mentioned means having an enlarged chamber at its point of communication with said tank and at a level below that of the upper end of said filler pipe so that the liquid does not pass beyond the enlarged chamber into the remaining portion when the level of liquid in said filler pipe is above said enlarged chamber.

5. The combination with a tank containing liquid and having a filler pipe extending upwardly thereabove, of an air chamber within said tank and communicating with the liquid at the depth to be measured, a pressure gauge, means for placing said air chamber and one side of said pressure gauge in communication, means for introducing air into said air chamber to free the same of liquid down to the point of communication of said air chamber with the liquid, and means for placing the other side of said pressure gauge and said tank above the liquid in communication to equalize the pressure therebetween, said last mentioned means including a chamber at its point of communication with said tank and located at a level below that of the upper end of said filler pipe so that the liquid does not pass beyond said chamber into the remaining portion of the pressure equalizing means when the level of liquid in said filler pipe is above said chamber.

In testimony whereof I affix my signature.

WILLIAM E. BANDEMER.